(12) United States Patent
Reynaert

(10) Patent No.: US 6,386,347 B1
(45) Date of Patent: May 14, 2002

(54) IMPACT ABSORBER AND METHOD OF MANUFACTURE

(75) Inventor: Alain Reynaert, Laigneville (FR)

(73) Assignee: Sollac, Puteaux (FR)

( * ) Notice: Subject to any disclaimer, the term of this patent is extended or adjusted under 35 U.S.C. 154(b) by 0 days.

(21) Appl. No.: 09/536,800

(22) Filed: Mar. 28, 2000

(30) Foreign Application Priority Data

Apr. 15, 1999 (FR) .............................................. 99 04701

(51) Int. Cl.$^7$ .................................................. F16F 7/12
(52) U.S. Cl. .................... 188/377; 188/376; 188/374
(58) Field of Search ................................ 188/377, 371, 188/374, 376; 267/139, 140, 64.19, 64.21, 116, 120

(56) References Cited

U.S. PATENT DOCUMENTS

| | | | | |
|---|---|---|---|---|
| 3,298,465 A | * | 1/1967 | Stastny ............................ | 188/1 |
| 3,508,744 A | * | 4/1970 | Kikukawa et al. ............. | 267/1 |
| 3,599,757 A | * | 8/1971 | Takamatsu .................. | 188/1 C |
| 5,224,574 A | * | 7/1993 | Thum .......................... | 188/371 |
| 5,293,973 A | * | 3/1994 | Thum .......................... | 188/377 |
| 5,403,049 A | * | 4/1995 | Ebbinghaus ................ | 293/133 |
| 5,404,974 A | * | 4/1995 | Thum et al. ................. | 188/372 |
| 5,588,511 A | * | 12/1996 | Kallenbach ................. | 188/371 |

FOREIGN PATENT DOCUMENTS

| | | |
|---|---|---|
| DE | 93 11 163 U | 11/1993 |
| DE | 43 16 164 A | 11/1994 |
| DE | 195 42 496 C | 10/1996 |
| DE | 297 03 843 U | 5/1997 |
| EP | 0 763 448 A | 3/1997 |
| FR | 2 698 674 A | 6/1994 |
| GB | 1 279 881 A | 6/1972 |

* cited by examiner

Primary Examiner—Christopher P. Schwartz
Assistant Examiner—Melody M. Burch
(74) Attorney, Agent, or Firm—Nixon Peabody LLP; Thomas W. Cole

(57) ABSTRACT

Impact absorber (1) of the type comprising two aligned parts of tubular overall shape and different cross sections, a plunger tube (3) and an absorber tube (4) joined together by a joining zone (2) where, in any plane of section passing through the axis of the tube formed by these two aligned parts, the following relationships are simultaneously satisfied:

$Ep > Ea$; $Rp < Rr.p$; $Ra > Rr.a$; $\frac{1}{2}(Da - Dp) > 2 \times Rr.a$; $Ra > Rp$, and a method for manufacturing this absorber by hydroforming.

16 Claims, 7 Drawing Sheets

IMPACT ABSORBER AND METHOD OF MANUFACTURE

FIELD OF THE INVENTION

The invention relates to an impact absorber of the type comprising two aligned parts of tubular overall shape and different cross sections, joined together by a joining zone:

that part of the tube which has the cross section of smaller surface area forming a plunger tube, that part of the tube which has the cross section of larger surface area forming an absorber tube as the casing of this tube is turned back under the action of the plunger tube at the region of the join, with free sliding about said plunger tube, said turning-back beginning at the region of the joining zone.

PRIOR ART

An absorber of this type is described, in particular, in Patent Applications EP 0 763 448 (Hoogovens) and FR 2,698,674 (GKN-LOHR); these types of absorbers are, in particular, fitted to motor vehicles to deaden accidental impacts of these vehicles, under damping and deceleration conditions that can be withstood, particularly by the passengers.

An important advantage of the absorbers described in these documents lies in their compactness: the energy absorbed per unit distance of deformation is very high, commonly of the order of 1000 J for 50 mm of deformation.

The drawbacks of the absorbers described in these documents relate to:

the risk that the turning-back may begin outside the join, for example at the other end of the absorber tube;

the fact that the force required to begin the turning-back is very much higher than the force required to sustain the turning-back, resulting in an initial force "spike" at the start of the impact, which leads to an excessively abrupt and/or dangerous deceleration prejudicial to good damping;

the risk that the sliding of the absorber tube with its turned-back part in the plunger tube will seize and jam.

Furthermore, the methods for manufacturing absorbers of this type also exhibit drawbacks:

these methods are generally expensive, for example because of the production of the join;

starting from a steel tube, a conventional method consists in expanding the tube over that part of its length which corresponds, to the absorber tube and this expansion is generally performed by deep drawing; this method therefore entails the use of grades of steel which are suited to deep drawing, generally having a yield stress Re<300 MPa, this restricting the performance of the absorber.

SUMMARY OF THE INVENTION

The object of the invention is to overcome these drawbacks.

To this end, the subject of the invention is an impact absorber of the type comprising two aligned parts of tubular overall shape and different cross sections, joined together by a joining zone:

that part of the tube which has the cross section of smaller surface area forming a plunger tube, that part of the tube which has the cross section of larger surface area forming an absorber tube as the casing of this tube is turned back under the action of the plunger tube at the region of the join, with free sliding about said plunger tube, said turning-back beginning at the region of the joining zone, wherein, in any plane of section passing through the axis of the tube formed by these two aligned parts, if $D_p$ denotes the outside diameter of said plunger tube and $D_a$ denotes the outside diameter of said absorber tube, if $E_p$ denotes the thickness of the plunger tube and $E_a$ denotes the thickness of the absorber tube, if $Rr.p$ is the natural outside radius of turning-back of the tubular casing of the plunger tube and if $Rr.a$ is the natural outside radius of turning-back of the tubular casing of the absorber tube, if said joining zone connects inwardly with said plunger tube, forming an outside radius of curvature $Rp$ and connects outwardly with said absorber tube, forming an outside radius of curvature $Ra$, then the following relationships are simultaneously satisfied:

$$E_p > E_a; \quad R_p < Rr.p; \quad R_a > Rr.a; \quad \tfrac{1}{2}(D_a - D_p) > 2 \times Rr.a; \quad R_a > R_p.$$

The invention may also exhibit one or more of the following features:

the two parts of tubular overall shape and the zone in which they join are essentially made of a metallic material, which preferably has a yield stress $Re > 300$ MPa, which may be a carbon steel or a stainless steel.

$Rp \leq 3 \times E_p$.

$Ra \geq 5 \times E_a$.

$\tfrac{1}{2}(D_a - D_p) > Ra + \tfrac{1}{2}Rp$ $\tfrac{1}{2}(D_a - D_p)$ & $(Rp + Ra)$ and $Ra \approx 2 \times Rr.a$.

$Da \leq 1.4\, Dp$.

said plunger tube has ribs.

Another subject of the invention is a method for manufacturing an impact absorber according to the invention from a tube made of a metallic material, which comprises a stage in which the cross section of this tube is expanded by hydroforming over at least part of its length so as to obtain, over at least part of the length of the tube, on one hand, that part of the tube which forms a plunger tube and, on the other hand, the expanded part which forms an absorber tube, these two parts being joined together by said joining zone.

The invention may also exhibit one or more of the following features:

the cross section of this tube is expanded over several unconnected parts along its length.

said metallic material has a yield stress $Re > 300$ MPa, and may, in particular, be a carbon steel or a stainless steel.

DESCRIPTION OF THE DRAWINGS

The invention will be better understood from reading the description which will follow, which is given merely by way of non-limiting example and with reference to the appended figures, in which:

FIG. 1 being a view in perspective from above, FIG. 2 being a view from the front in section on a plane passing through the axis of the cylinder, and FIG. 3 being a perspective view of the same section.

FIGS. 4 and 5 relating to the absorber before deformation and for two geometries which differ only in the region of the join, and FIG. 6 relating to the absorber wherein portion 14 is a view of the joining zone and after deformationy.

DESCRIPTION OF THE PREFERRED EMBODIMENTS

Figure 1:
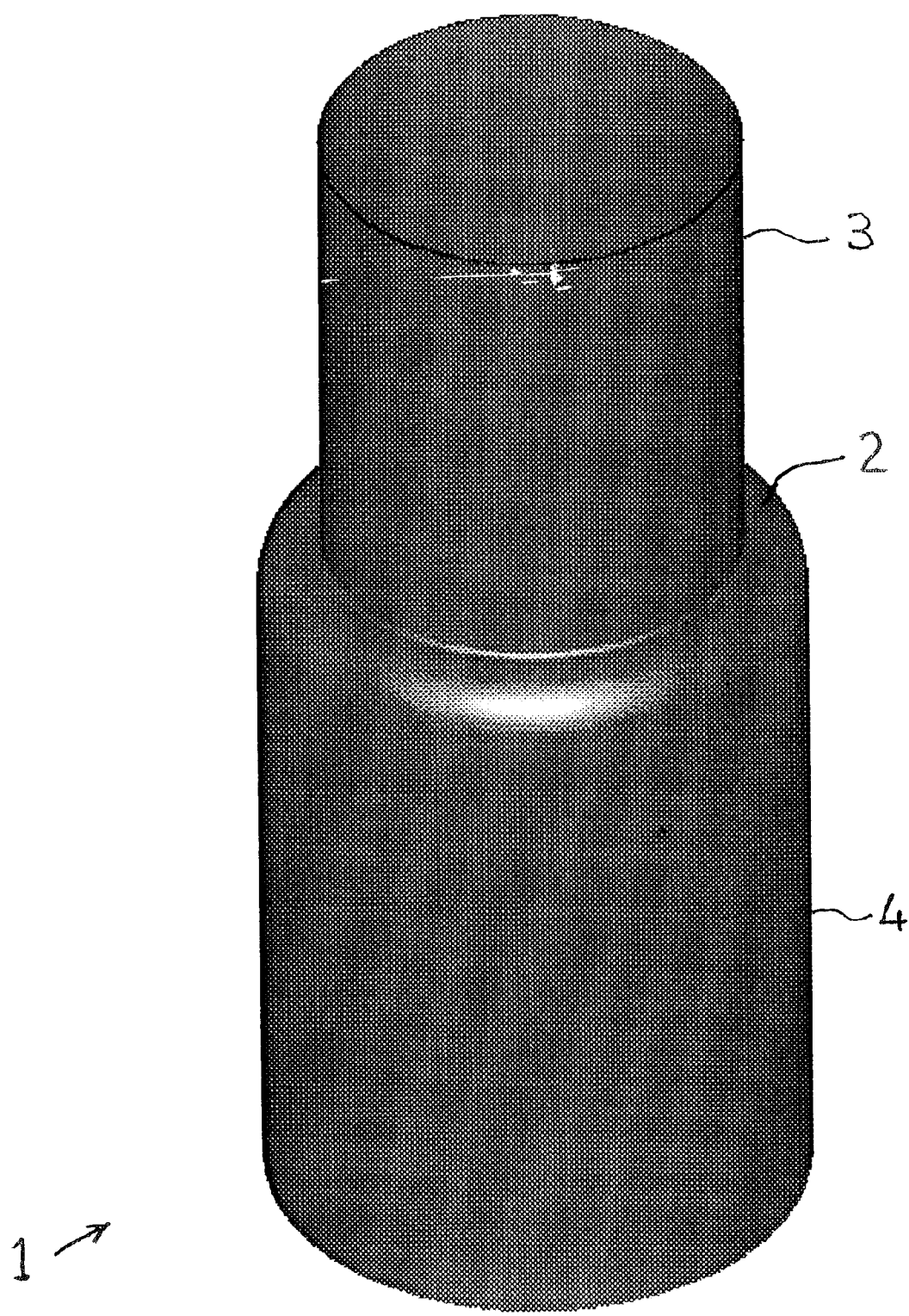
FIGS. 1 to 3 are overall views of an absorber according to the invention, in this instance of cylindrical tubular overall shape.
Figure 2:
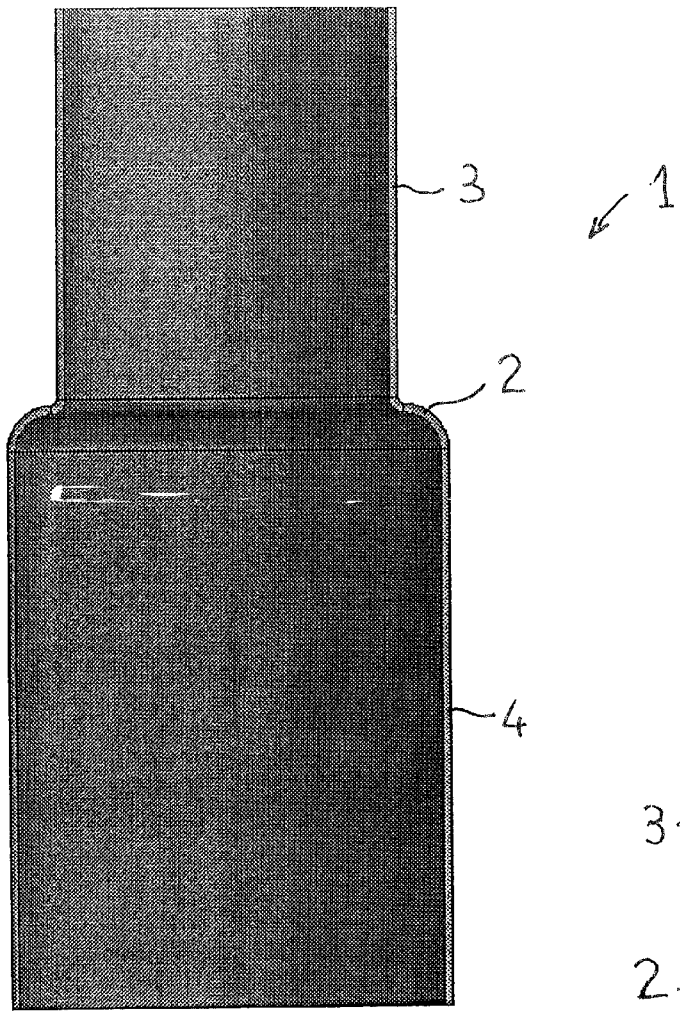
Figure 3:
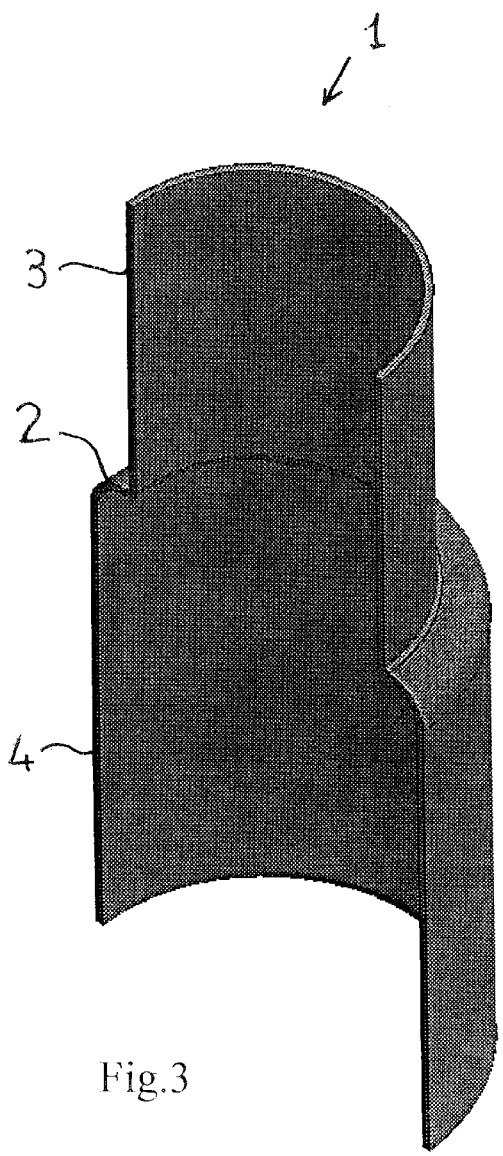

As depicted in FIGS. 1 to 3, the impact absorber 1, in this instance of circular cross section, comprises two aligned parts of different cross sections joined together by a joining zone 2:

that part of the tube which has the cross section of smaller surface area forms a plunger tube 3, that part of the tube which has the cross section of larger surface area forms an absorber tube 4.

Figure 5:
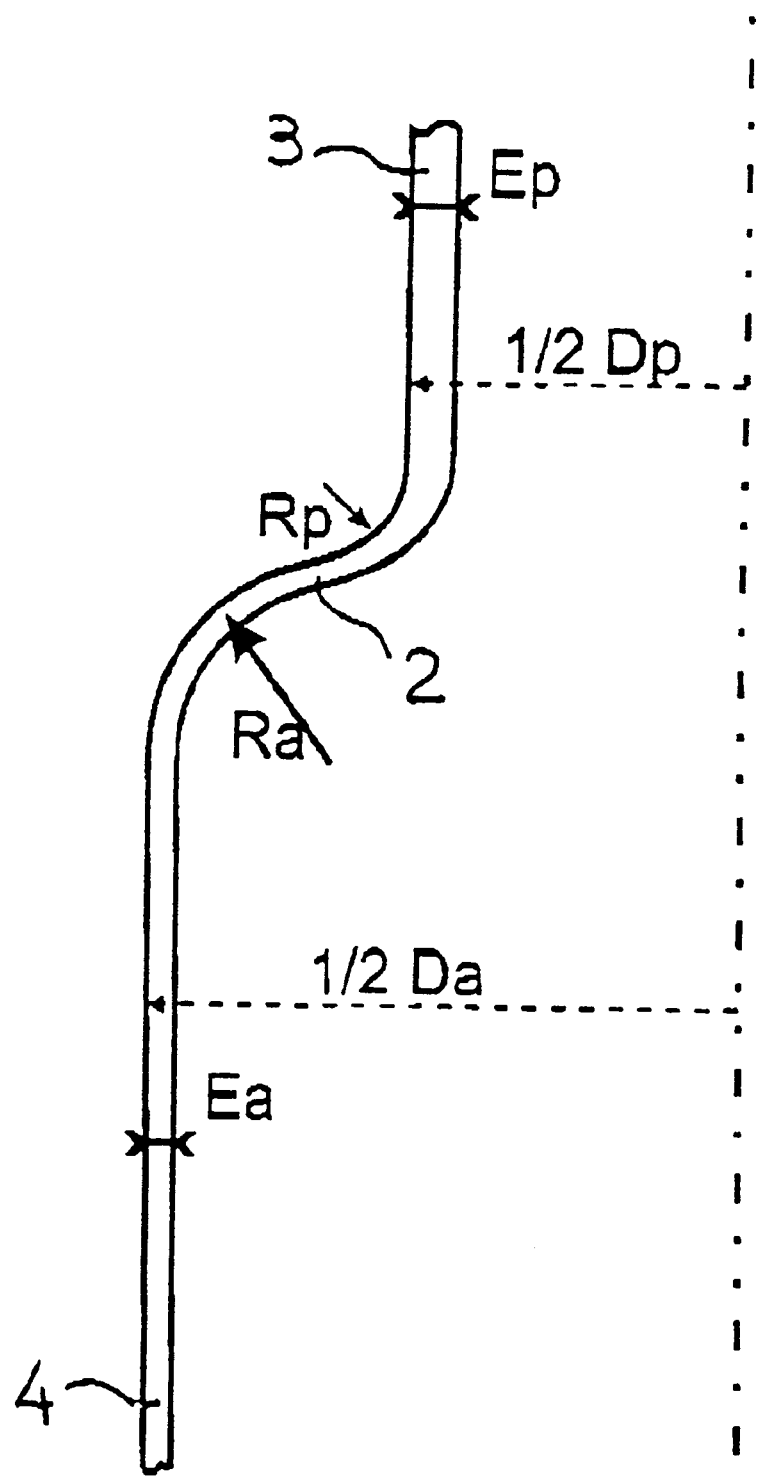

We refer now to FIG. 5 which depicts, in the region of the joining zone, a detailed view of a section in any plane of section passing through the axis of the tube formed by the two aligned parts, to define the following parameters:

Dp denotes the outside diameter of the plunger tube 3 and Da denotes the outside diameter of the absorber tube 4, Ep denotes the thickness of the plunger tube 3 and Ea denotes the thickness of the absorber tube 4, Rr.p denotes the natural outside radius of turning-back of the tubular casing of the plunger tube 3 and Rr.a denotes the natural outside radius of turning-back of the tubular casing of the absorber tube 4, the joining zone 2 connects inwardly with the plunger tube 3, forming an outside radius of curvature Rp and connects outwardly with the absorber tube 4, forming an outside radius of curvature Ra.

The axis of the tube should be understood as meaning the direction of the tube passing through the center of gravity of the cross sections of each part—plunger tube 3 and absorber tube 4.

Figure 4:
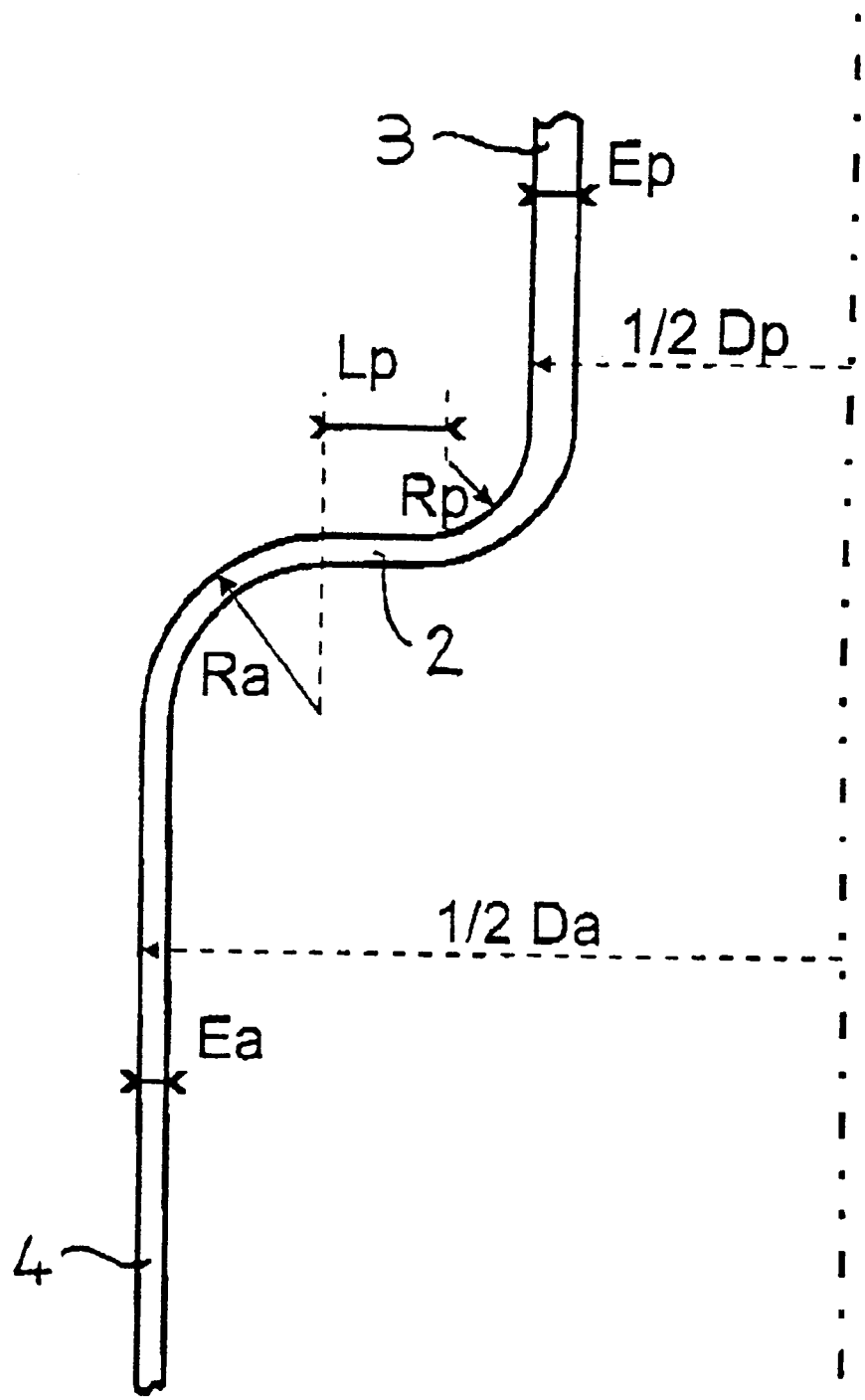
FIGS. 4 to 6 are partial diagrams of the same section as FIGS. 2 and 3, in the region of the joining zone.
Figure 6:
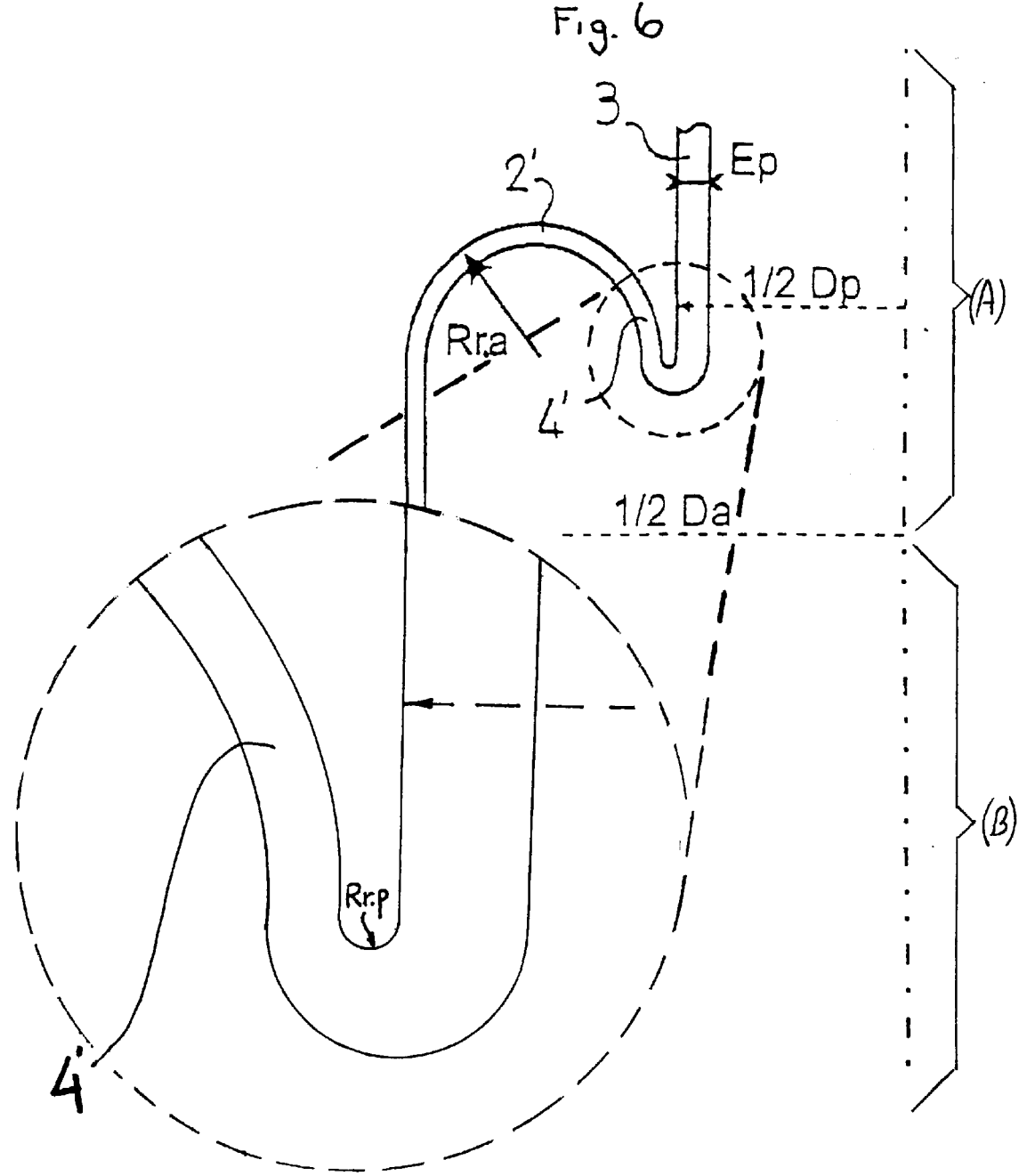

As depicted in FIG. 6 which, like FIGS. 4 and 5, depicts a detailed view of a section in the region of the joining zone 2 but after deformation under impact, the absorber 1 works by the turning-back of the casing of the absorber tube 4 under the action of the plunger tube 3 at the region of the join 2; this turning-back begins in the region of the joining zone 2' and takes place with a turning-back radius Rr.a.

According to the invention, the following relationships are simultaneously satisfied:

$$Ep>Ea;\ Rp<Rr.p;\ Ra>Rr.a;\ \tfrac{1}{2}(Da-Dp)>2\times Rr.a;\ Ra>Rp.$$

The conditions Ep>Ea; Rp<Rr.p; and Ra>Rr.a guarantee the sharing of the following functions: the thicker tube (Ep>Ea) acts as the plunger tube and carries no risk of being turned back, (Rp<Rr.p), and the thinner tube intended to be turned back (Ra>Rr.a) acts as the absorber tube.

The condition ½(Da−Dp)>2×Rr.a guarantees that the inside diameter of the part 4' of the turned-back absorber tube (Da−4×Rr.a) remains markedly smaller than the outside diameter Dp of the plunger tube 3, so as to be able to slide freely in this plunger tube 3.

The condition Ra>Rp is highly advantageous because it allows the turning-back of the absorber 4 to begin appropriately at the region of the join 2.

By virtue of the invention, an impact absorber is obtained which, at the start of the impact, does not experience any initial force which causes an excessively high deceleration; the risk of the sliding of the plunger tube 3 in the turned-back absorber tube 4' seizing and jamming is also avoided.

In order to obtain good mechanical performance, the absorber 1 is preferably made essentially of a metallic material; this absorber may be coated with non-metallic materials, such as paint, and/or fitted with equipment made of non-metallic materials.

Still with a view to improving the mechanical performance, the material chosen is preferably a metallic material with a yield stress Re>300 MPa.

A carbon steel or a stainless steel, for example, is chosen by way of a metallic material.

Other mechanical properties regarding the joining zone are advantageous:

Rp<3×Ep.

This is because, for obvious geometric reasons, Rr.p>2× Ep, and in practice, 3×Ep<Rr.p<5×Ep, and so, by choosing Rp<3×Ep, the condition Rp<Rr.p is sure to be satisfied.

Ra>5×Ea.

This is because, for obvious geometric reasons, Rr.a>2× Ea, and in practice, 3×Ea<Rr.a<5×Ea, and so, by choosing Ra>5×Ea, the condition Ra>Rr.a is sure to be satisfied.

½(Da−Dp)≧Ra+½Rp.

This additional condition makes it possible to limit the risk of buckling, avoid the drawback of the initial force spike in the deformation of the absorber at the beginning of the impact and makes it possible to limit the risk of the sliding of the plunger tube in the absorber tube during turning-back jamming and seizing.

½(Da−Dp)≈(Rp+Ra) and Ra≈2×Rr.a.

These additional conditions allow the value of Da to be optimized, particularly with a view to minimizing the weight of the absorber.

Da≦1.4 Dp.

This condition also allows the weight of the absorber to be minimized; it is particularly well suited to the instance in which the absorber is produced by hydroforming, and the factor 1.4 then corresponds to a hydroforming expansion ratio commonly applied to tubular shapes made of steel.

FIG. 4 diagrammatically depicts the scenario in which ½(Da−Dp)>Ra+Rp, which means that the joining zone 2 has a plateau Lp wide.

Figure 8:
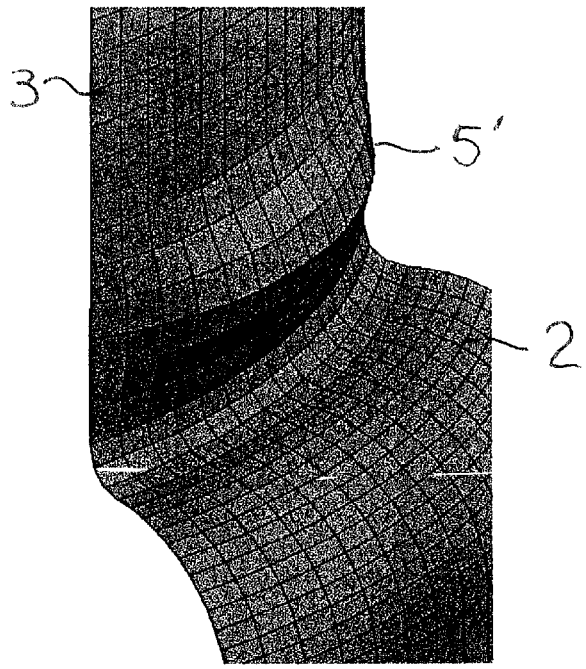
FIGS. 8 and 9 show alternative forms of the absorbers according to the invention, seen in partial perspective, when the part forming the plunger tube has ribs.
Figure 9:
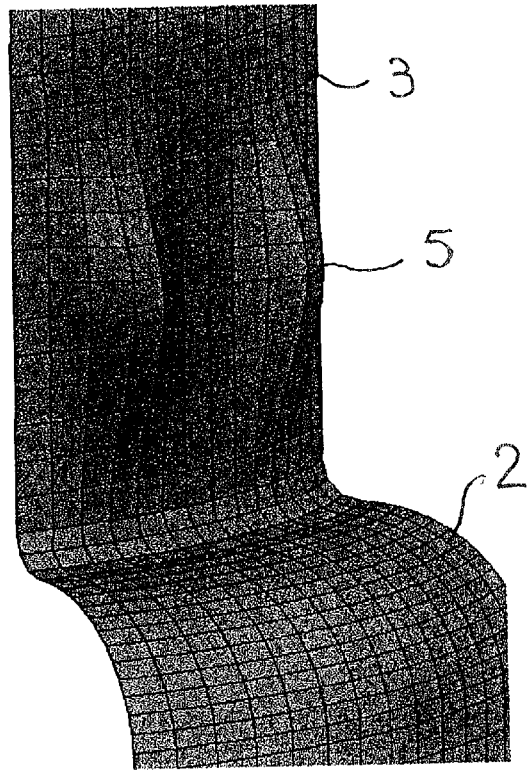

In another preferred alternative form of the invention, which refers to FIGS. 8 and 9 which are part views of the absorber in the region of the joining zone 2, the plunger tube 3 has ribs 5', 5; surprisingly, it has been found that these ribs had a favorable effect on the onset of deformation of the absorber in the region of the join; this effect was achieved regardless of the direction of the ribs: parallel to the axis of the tube (FIG. 9) or perpendicular to this axis (FIG. 8).

These ribs also have an anti-buckling effect.

As regards the maximum depth Np of these ribs, there are two possible scenarios:

either they face in toward the inside of the tube (this scenario is not depicted), or, according to the scenarios depicted, they face toward the outside of the tube; in this scenario, it is appropriate for: Np<½(Da−Dp)−2Rr.a, in order not to slow down the sliding of the plunger tube 3 in the turned-back absorber tube 4' at the time of the impact.

One particularly advantageous method for manufacturing the absorber according to the invention will now be described for an instance in which a metallic material, particularly a carbon steel or a stainless steel, is used.

The starting point is a metallic tube with a length of constant cross section.

The method according to the invention comprises a stage in which the cross section of the starting tube is modified by hydroforming over at least part of its length, so as to obtain:

- on the one hand, a part of the tube, the cross section of which has a smaller surface area, forming a plunger tube, and
- on the other hand, an expanded tube part, the cross section of which has a larger surface area, forming an absorber tube,
- these two parts being joined together by a joining zone which satisfies the geometric criteria of the absorber according to the invention.

This method of manufacture is particularly economical.

In practice, in this method, hydroforming leads to the cross section of the tube being expanded between two ends which are kept impervious to the expansion fluid and in which the cross section does not vary; the tube has then to be cut in two at its expanded part, which then yields at least one, and generally two, absorbers according to the invention.

To limit the amount of metal scrapped and the number of hydroforming operations, the cross section of the starting tube is advantageously modified by hydroforming according to this method over several unconnected parts of its length; the tube subsequently being cut at each expanded part, to thus obtain a great many absorbers in a single hydroforming operation.

By virtue of the invention, it is possible to use high-strength materials to make the impact absorbers according to the invention, thus making it possible to make further advances regarding performance and/or compactness and weight; use is thus preferably made of materials whose yield stress Re is higher than 300 MPa, which could not readily be used in the prior art when expanding the tube by deep drawing.

As a preference, the metallic material used is a carbon steel or a stainless steel.

The following examples illustrate the invention.

EXAMPLE 4

This example is intended to illustrate the dimensions of an absorber according to the invention when it is of circular cross section along its entire length, in two scenarios, A and B, which differ as regards the tube wall thicknesses.

The material taken was a steel of the SOLPHASE™ 600 grade made by the SOLLAC company; this is a steel containing two metallurgical phases with a high level of consolidation; manufacture was performed as described in example 2, starting from a tube made of this steel; other manufacturing methods described in the prior art may be used; the mechanical properties of the starting tube were: yield stress Re=643 MPa, breaking stress Rm=692 MPa.

In this example, two absorbers were prepared with different tube wall thicknesses but the same external dimensions.

Scenario A: Thick Walls:

| | | | |
|---|---|---|---|
| Da = 104 mm | Ea = 1.8 mm | Ra = 10 mm | Rr.a = 4.5 mm |
| Dp = 80 mm | Ep = 2.1 mm | Rp = 2 mm | Rr.p = 5 mm |

Scenario B: Thin Walls:

| | | | |
|---|---|---|---|
| Da = 104 mm | Ea = 1.65 mm | Ra = 10 mm | Rr.a = 4.3 mm |
| Dp = 80 mm | Ep = 1.9 mm | Rp = 2 mm | Rr.p = 4.5 mm |

Furthermore, the length of the part of the tube of smaller cross section forming the plunger tube was 72 mm and the length of the part of the tube of larger cross section forming the absorber tube was 100 mm; the possible travel for absorbing the impact was therefore of the order of 150 mm.

These two absorbers were then tested by applying to them an impact corresponding to an impact by a mass of 1000 kg which had an initial speed of 15.2 km/h. The force (kN) to which the absorber was subjected as a function of time (ms) and the impact energy (J: joule) dissipated by the deformation of the absorber as a function of time (ms) were measured. The results obtained over one eighth of a cylinder are collated in FIG. 7: curves A1 (force) and A2 (energy) for scenario A, and curves B1 (force) and B2 (energy) for scenario B.

Figure 7:
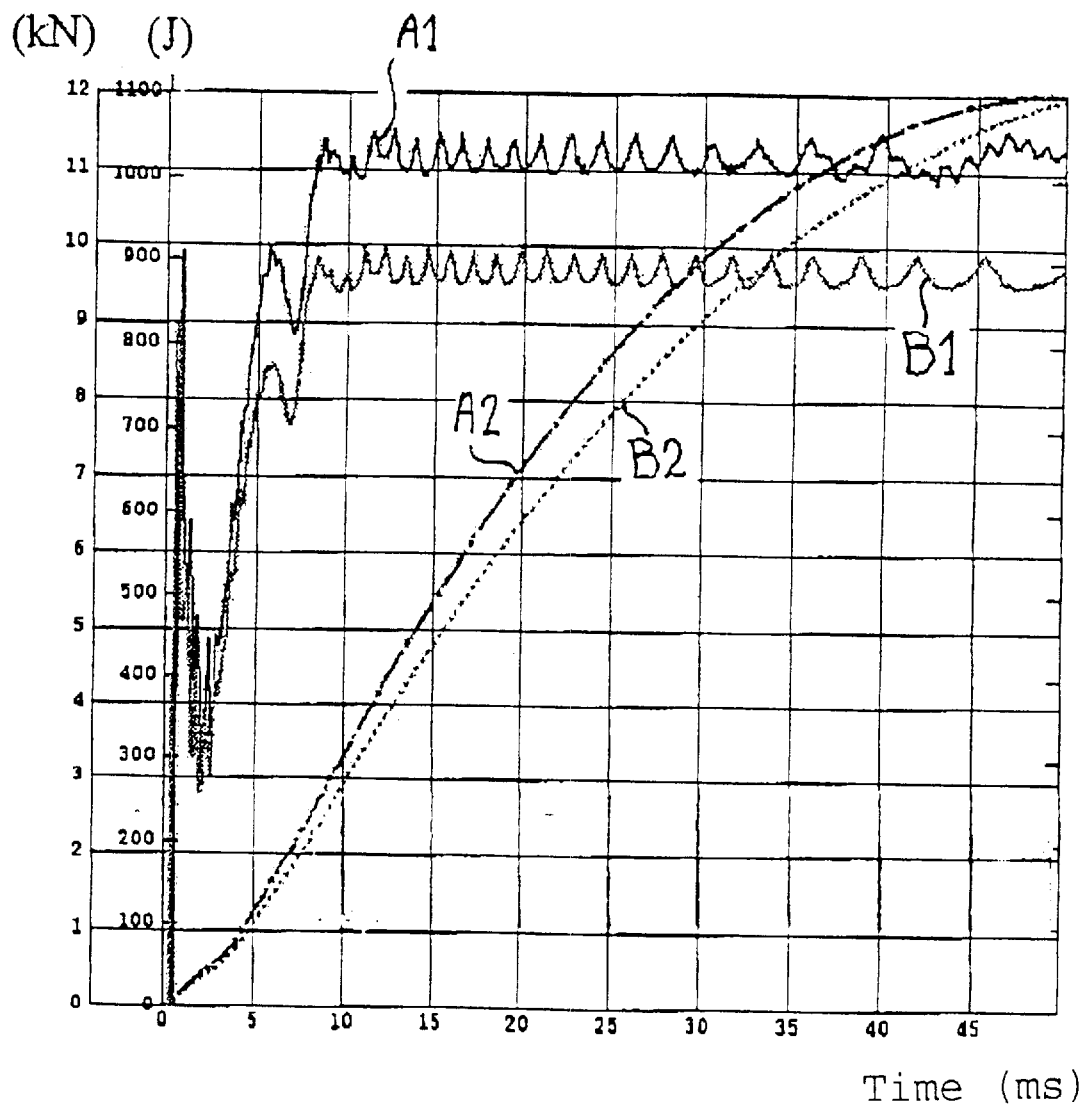
FIG. 7 illustrates the results obtained in the case of example 1, for one eighth of a cylinder.

A force of 90 kN was obtained with the wall thicknesses of 2.1 mm on the plunger and 1.8 mm on the expanded part (the scale in FIG. 7 is to be multiplied by 8).

A force of 78 kN was obtained with the wall thicknesses of 1.9 mm on the plunger and 1.65 mm on the expanded part (the scale in FIG. 7 is to be multiplied by 8).

The force curves (A1, B1) are considered not to exhibit any spike, the transient phenomenon at the start of deformation generating no sharp deceleration and having no possible influence on the safety of the passengers of a vehicle fitted with these absorbers and subjected to this impact.

In FIG. 7, the force curves (A1, B1) exhibit a stable plateau with small-amplitude fluctuations about the mean value; this plateau or constant-level shape and the small amplitude of the fluctuations are significant advantages in this type of absorber.

EXAMPLE 2

The purpose of this example is to illustrate the manufacture of an absorber by hydroforming, this absorber having the same external dimensions as those in example 1.

The starting point is a steel tube with an outside diameter of 45 mm, a wall thickness of 1.5 mm and made of steel of the SOLPHASE™ 600 grade, 4000 mm long; a conventional hydroform plant was used to swell the central part of this tube in a die over a length of 210 mm by subjecting the inside of the tube to a liquid pressure of $90 \times 10^{+6}$ Pa and applying an axial thrust to seal the ends of this tube.

Having caused the perimeter of the tube to expand, the tube thus expanded is cut into two parts of equal length on a plane perpendicular to the axis of the tube; this then yields two absorbers, the expanded parts of which form absorber tubes and which, after the reduction in thickness resulting from the expansion, have a thickness Ea=1.35 mm, and the non-expanded parts of which form plunger tubes and have the starting thickness Ep=1.5 mm.

This method for manufacturing an impact absorber according to the invention is particularly economical by comparison with the methods of the prior art; it makes it possible to use a wider range of grades of steel which is not restricted to the range of steels for deep drawing as was the case in the prior art when using a method for expanding the tube by drawing; in that deep-drawing method, the SOLPHASE 600™ grade could not have been used.

EXAMPLE 3

The purpose of this example is to illustrate the performance that can be achieved using these stronger grades of steel, which could not be used in the deep-drawing method of the prior art.

Two absorbers according to example 1 (scenario B) were made by hydroforming as described in example 2 from two different grades of steel with different mechanical properties (Re, Rm).

The next table summarizes the mechanical properties of these steels and the performance of the absorber obtained, in terms of the force measured at the constant level (see FIG. 7 where the constant level is reached after 7 to 8 ms) under the impact conditions of the tests of example 1.

| Grade of steel: | Mechanical properties STEEL | | Performance ABSORBER Force obtained at the constant level (FIG. 7) |
| --- | --- | --- | --- |
| | Yield stress (Re) | Breaking stress (Rm) | |
| SOLPHASE 600 ™ | 640 MPa | 690 MPa | 99 kN |
| Normalized E24 steel | 420 MPa | 500 MPa | 60 kN |

By virtue of the use of appropriate grades of steel, and because these can be used in the method of the invention, it is thus possible to obtain high-performance absorbers economically.

EXAMPLE 4

The purpose of this example is to illustrate the dimensions of an absorber according to the invention when the part forming the absorber tube is of elliptical cross section; as the part forming the absorber tube has a cross section with a larger surface area than the cross section of the other part, it is this part which has the largest bulk; the choice of an elliptical cross section therefore allows the bulk in the direction of the minor axis of the ellipse to be reduced, and thus makes the absorber easier to incorporate, particularly into a vehicle.

Material used: steel of the SOLFORM™ 550 grade made by the SOLLAC company; this is a hot-rolled steel intended for cold-forming, the mechanical properties of which are: yield stress Re between 405 and 485 MPa and breaking stress higher than 540 MPa.

The absorber was made with the following dimensions:

Dimensions in a plane of section passing through the major axis of the ellipse and the axis of the tube:

| | | | |
| --- | --- | --- | --- |
| Da = 112 mm | Ea = 1.7 mm | Ra = 14 mm | Rr.a = 4.4 mm |
| Dp = 80 mm | Ep = 2.1 mm | Rp = 2 mm | Rr.p = 5 mm |

Dimensions in a plane of section passing through the minor axis of the ellipse and the axis of the tube:

| | | | |
| --- | --- | --- | --- |
| D'a = 100 mm | E'a = 1.8 mm | R'r.a = 8 mm | R'r.a = 4.5 mm |
| D'p = Dp = 80 mm | E'p = Ep = 2.1 mm | R'p = Rp = 2 mm | R'r.p = Rr.p = 5 mm |

The performance obtained was comparable with that of the absorbers of example 1.

EXAMPLE 5

The purpose of this example is to illustrate the dimensions of an absorber according to the invention when it is of polygonal cross section along its entire length (plunger tube and absorber tube).

Material: steel of the SOLFORM™ 600 grade, 1.5 mm thick.

Octagonal cross section.

Dimensions in the plane of section passing through the center of the faces, the diameters Da and Dp then being smaller than the diameters D'a and D'b measured in the plane of section passing through the vertices:

| | | | |
| --- | --- | --- | --- |
| Da = 104 mm | Ea = 1.65 mm | Ra = 10 mm | Rr.a = 4.3 mm |
| Dp = 80 mm | Ep = 1.9 mm | Rp = 2 mm | Rr.p = 4.5 mm |

The connecting radii Ra and Rp are kept constant in all the planes of section containing the axis of the tube.

EXAMPLE 6

The purpose of this example is to illustrate an absorber according to the invention, identical to the one (scenario B) of example 1, except that the plunger tube has ribs.

This absorber is therefore still of tubular overall shape.

As depicted in FIG. 9, eight ribs extending in the direction of the axis of the tube are distributed around the circumference of the part forming the plunger tube.

These ribs extend in the direction of the axis of the tube over a length of 25 mm and have a maximum width of the order of 8 mm and a depth facing outward of the order of Np=2 mm.

It may be seen that these ribs have an anti-buckling effect and, surprisingly, an effect of encouraging the absorber to start to deform in the event of an impact.

What is claimed is:

1. An impact absorber of the type comprising two aligned parts of a tubular overall shape, each part having a different cross section, and the two aligned parts being joined together by a joining zone, such that:

the aligned part of the impact absorber which has a smaler surface area cross section is a plunger tube, the aligned part of the inpact absorber which has a larger surface area cross section is an abosorber tube in which as the absorber tube is turned-back under the action of the plunger tube at the region of the joining zone, with a turned-back portion of the impact absorber freely sliding about said plunger tube, said turned-back portion begins at the region of the joining zone, wherein, for any plane of section passing through the axis of the tube formed by the two aligned parts, Dp denotes the outside diameter of said plunger tube and Da denotes the outside diameter of said absorber tube, Ep denotes the thickness of the plunger tube and Ea denotes the thickness of the absorber tube, Rr.p is the natural outside radius of the turned-back portion of the tubular casing of the plunger tube and Rr.a is the natural outside radius of the turned-back portion of the tubular casing of the absorber tube, and, said joining zone, prior to turning back the absorber tube, connects inwardly with said plunger tube, forming an outside radius of curvature Rp, and connects outwardly with said absorber tube, forming an outside radius of curvature Ra, such that the following five relationships are simultaneously satisfied:

$$Ep>Ea;\ Rp<Rr.p;\ Ra>Rr.a\ \frac{1}{2}(Da-Dp)>2\times Rr.a;\ Ra>Rp.$$

2. The impact absorber as claimed in claim 1, wherein the two aligned parts of tubular overall shape and the joining zone are essentially made of a metallic material.

3. The impact absorber as claimed in claim 2, wherein said metallic material has a yield stress Re>300 MPa.

4. The impact absorber as claimed in claim 2, wherein said metallic material is a carbon steel.

5. The impact absorber as claimed in claim 2, wherein said metallic material is a stainless steel.

6. The impact absorber as claimed in claim 1, wherein Rp≦3×Ep.

7. The impact absorber as claimed in claim 1, wherein Ra≧5×Ea.

8. The impact absorber as claimed in claim 1, wherein: ½(Da−Dp)≧Ra+½ Rp.

9. The tubular impact absorber as claimed in claim 8, wherein ½(Da−Dp)≈(Rp+Ra) and Ra≈2×Rr.a.

10. The impact absorber as claimed in claim 1, wherein: Da≦1.4 Dp.

11. The impact absorber as claimed in claim 1, wherein said plunger tube has ribs.

12. A method for manufacturing an impact absorber as claimed in claim 1 from a tube of a metallic material, which comprises a stage in the method in which the cross section of the tube is expanded by hydroforming over at least part of the tube length so as to obtain, over at least part of the length of the tube, the part of the tube which forms the plunger tube and, an expanded part which forms the absorber tube, wherein the two parts are joined together by the joining zone.

13. The method as claimed in claim 12, wherein the cross section of the tube is expanded over several unconnected parts along the tube length.

14. The method as claimed in claim 12, wherein said metallic material has a yield stress Re>300 MPa.

15. The method as claimed in claim 12, wherein said metallic material is a carbon steel.

16. The method as claimed in claim 12, wherein said metallic material is a stainless steel.

* * * * *